US007155382B2

(12) United States Patent
Boys (10) Patent No.: US 7,155,382 B2
(45) Date of Patent: Dec. 26, 2006

(54) AUDIO-VISUAL LANGUAGE INSTRUCTION SYSTEM WITHOUT A COMPUTER

(76) Inventor: Donald R. Boys, 2720 Tierra Way, Aromas, CA (US) 95004

( * ) Notice: Subject to any disclaimer, the term of this patent is extended or adjusted under 35 U.S.C. 154(b) by 635 days.

(21) Appl. No.: 10/161,929

(22) Filed: Jun. 3, 2002

(65) Prior Publication Data

US 2003/0225570 A1    Dec. 4, 2003

(51) Int. Cl.
*G06F 17/28* (2006.01)
(52) U.S. Cl. .................................. 704/2; 704/9; 704/8
(58) Field of Classification Search ................ 704/2–8
See application file for complete search history.

(56) References Cited

U.S. PATENT DOCUMENTS

| | | | | |
|---|---|---|---|---|
| 4,884,974 A | * | 12/1989 | DeSmet | 434/317 |
| 5,413,486 A | * | 5/1995 | Burrows et al. | 434/317 |
| 6,041,025 A | * | 3/2000 | Ohga et al. | 369/30.28 |
| 6,041,215 A | * | 3/2000 | Maddrell et al. | 434/317 |
| 6,313,828 B1 | * | 11/2001 | Chombo | 345/169 |
| 6,330,427 B1 | * | 12/2001 | Tabachnik | 434/317 |
| 6,791,529 B1 | * | 9/2004 | Shteyn | 345/156 |
| 2002/0077804 A1 | * | 6/2002 | Gohari | 704/2 |
| 2004/0015360 A1 | * | 1/2004 | Calabrese | 704/270 |

OTHER PUBLICATIONS

Yoshida, The Rewritable MiniDisc System, 1994, IEEE p. 1-12.*

* cited by examiner

*Primary Examiner*—Richemond Dorvil
*Assistant Examiner*—Lamont Spooner
(74) *Attorney, Agent, or Firm*—Donald R. Boys; Central Coast Patent Agency, Inc.

(57) ABSTRACT

A learning system has at least one printed entity comprising lesson information in an ordered series of one or more of sentences, phrases, pictures, or alphanumeric representations, a digital memory media having recorded thereon separately playable audio files comprising one or both of vocal renditions of individual ones of the sentences or phrases, vocal renditions related to entities in the pictures, or information files, and a digital player for playing the audio files from the memory media, rendering the audio files audible, and having a user interface for selecting and initiating playing of individual ones of the files, individually or in a predetermined order. The system is characterized in that individual ones of the pictures, sentences, phrases, or alphanumeric representations are annotated by visible indicia in the printed entity or entities, and the user interface of the digital player enables the user to select files to play by selecting individual ones of the visible indicia associated with individual ones of the audio files.

6 Claims, 8 Drawing Sheets

AUDIO-VISUAL LANGUAGE INSTRUCTION SYSTEM WITHOUT A COMPUTER

FIELD OF THE INVENTION

The present invention is in the field of instruction systems, and pertains more particularly to an integrated combination of printed media and digital audio, and to methods of using the combination in instruction for a wide variety of subject matter, including language instruction.

BACKGROUND OF THE INVENTION

There are many kinds of systems available for instruction in many subject areas and disciplines, including language instruction; and there sadly remain a great plurality of persons worldwide who would profit by being able to learn many subjects and disciplines, including languages, but have no access to any of the many available systems. The present inventor believes that an important reason for this disparity is that instruction by any of the systems in the current art is relatively expensive, and therefore out of reach for most people. For example, not everyone has access to formal schooling, either public or private. In the inventor's opinion, public schooling, being in general government-controlled and operated, is becoming increasingly more ineffective as time goes by, and private schooling is more scarce and expensive. For a single example, in California, which is the home state of the present inventor, there are many immigrants from Mexico and other regions whose natural language is not English, and who would profit greatly from an easily accessible and inexpensive system that could help them learn English.

Outside of schooling systems, there are, particularly in such areas as language instruction, many for-profit enterprises that provide instruction systems, including such as cassette-tape instruction systems. These sorts of instruction systems tend to be quite expensive, and are therefore outside of the ability of many to acquire. Such audio learning systems, often combined with written material, as known in current art, also have other drawbacks in addition to expense. Such systems, in order to minimize production costs, are typically based on audio tape. A common drawback of tape-based systems is that it is difficult to quickly seek and access specific portions of audio. One has to rewind the tape, fast-forward or fast-reverse, for example, and replay a small portion, sometimes with several tries, to find a desired portion for review.

Another common sort of instruction system is computer-based, including CD-ROM and Web-based systems. These, because a high-end computer is required, and an ability to use the computer, not to mention Internet access, are simply completely out of reach for the large majority of people who need instruction most.

What is clearly needed is a system in which the audio component is based on digital audio, allowing rapid seek and access, and using the least costly digital memory available. The system needs to be based on apparatus, as well, that is inexpensive, rather than on computers that have a lot of characteristics and abilities not needed for the task at hand. A system that meets these objects, and that can reach and help many times more people than systems in the current art, is taught in enabling detail below.

SUMMARY OF THE INVENTION

In a preferred embodiment of the present invention a learning system is provided comprising at least one printed entity comprising lesson information in an ordered series of one or more of sentences, phrases, pictures, or alphanumeric representations, a digital memory media having recorded thereon separately playable audio files comprising one or both of vocal renditions of individual ones of the sentences or phrases, vocal renditions related to entities in the pictures, or information files, and a digital player for playing the audio files from the memory media, rendering the audio files audible, and having a user interface for selecting and initiating playing of individual ones of the files, individually or in a predetermined order. The system is characterized in that individual ones of the pictures, sentences, phrases, or alphanumeric representations are annotated by visible indicia in the printed entity or entities, and the user interface of the digital player enables the user to select files to play by selecting individual ones of the visible indicia associated with individual ones of the audio files.

In a preferred embodiment the input interface enables a user to select between a vocal rendition of a sentence, a phrase, or a rendition related to a picture, and a supplemental information file, both associated with the same indicia. In some cases printed entity has only pictures, and the audio files are associated with entities depicted in the pictures. In a preferred embodiment the memory media comprises Compact Disc Read Only Memory (CD-ROM) minidiscs.

Also in a preferred embodiment the system is dedicated to language instruction, comprising a first printed entity having sentences or phrases in a first language and a second printed entity having sentences or phrases in a second language associated one-to-one with the sentences or phrases in the first printed entity. In these embodiments the audio files comprise audio renditions of the sentences or phrases in both the first and second languages. The audio files may further comprise supplemental information files associated with individual ones of the sentences or phrases in one or both languages, the supplemental information files for sentences or phrases in the first language recorded in the second language, and the supplemental information files for sentences and phrases in the second language recorded in the first language.

In some preferred embodiments the user interface comprises a display, a jogging wheel, and a play-once input mechanism, the display scrolls between individual ones of the visual indicia in response to movement of the jogging wheel, and the player plays an audio file associated with the displayed indicia in response to input from the play-once input mechanism. Also in some embodiments the user interface further comprises a first and a second input mechanism for selecting the first or the second language, wherein the user interface, after a user input from the first language input mechanism, displays indicia for and plays audio files in the first language, and after a user input from the second language input mechanism, displays indicia for and plays audio files in the second language. The visible indicia for associated sentences of phrases in the two languages may be the same indicia.

In a further preferred embodiment there is a first supplemental information input mechanism and a second supplemental information input mechanism, wherein, after an input from the first supplemental information input mechanism, the player, in response to an input from the play-once input mechanism, plays a supplemental information file associated with the indicia displayed.

In another aspect of the invention a method for instruction is provided, comprising the steps of (a) preparing a printed entity comprising lesson information in an ordered series of one or more of sentences, phrases, pictures, or alphanumeric representations; (b) recording on a digital memory separately playable audio files comprising one or both of vocal renditions of individual ones of the sentences or phrases, vocal renditions related to entities in the pictures, or information files; and (c) providing a digital player compatible with the memory media for playing the audio files from the memory media, rendering the audio files audible, the digital player having a user interface for selecting and initiating playing of individual ones of the files, individually or in a pre-determined order, such that a user may view the printed sentences, phrases, pictures or alphanumeric representations, and at the same time select and play associated audio files.

In a preferred embodiment of the method the pictures, sentences, phrases, or alphanumeric representations are annotated with visible indicia, and the user interface uses the indicia for selection of files to play. The user interface in some embodiments comprises a display, and the visible indicia are selectively displayed for association with the pictures, sentences, phrases, or alphanumeric representations. In some cases the input interface enables a user to select between a vocal rendition of a sentence, a phrase, or a rendition related to a picture, and a supplemental information file both associated with the same indicia. In some cases the printed entity has only pictures, and the audio files are associated with entities depicted in the pictures. A preferred media is Compact Disc Read Only Memory (CD-ROM) minidiscs.

In some preferred embodiments the system is dedicated to language instruction, and in step (a), two printed entities are prepared, a first printed entity having sentences or phrases in a first language and a second printed entity having sentences or phrases in a second language, with the sentences and phrases associated one-to-one, and having substantially the same meaning. In these embodiments the audio files comprise audio renditions of the sentences or phrases in both the first and second languages. There may also be supplemental information files associated with individual ones of the sentences or phrases in one or both languages.

In preferred embodiments the user interface comprises a display, a jogging wheel, and a play-once input mechanism, the display scrolls between individual ones of the visual indicia in response to movement of the jogging wheel, and the player plays an audio file associated with the displayed indicia in response to input from the play-once input mechanism. The user interface may also comprise a first and a second input mechanism for selecting the first or the second language, and the user interface, after a user input from the first language input mechanism, displays indicia for and plays audio files in the first language, and after a user input from the second language input mechanism, displays indicia for and plays audio files in the second language. The visible indicia for associated sentences of phrases in the two languages may be the same.

In some embodiments there is a first supplemental information input mechanism and a second supplemental input mechanism, and wherein, after an input from the first supplemental information input mechanism, the player, in response to an input from the play-once device, plays a supplemental information file associated with the indicia displayed.

In yet another aspect of the invention a digital player is provided, comprising a system for reading audio files from a digital memory media, and for rendering the files audible, a display for displaying visible indicia associated with individual ones of the audio files, and an input mechanism for causing display or highlighting displaying individual ones of the visible indicia and for selecting one among the indicia. The player is characterized in that the digital player plays the file associated with the selected indicia.

In preferred embodiments there is a jogging wheel, wherein individual indicia are displayed or highlighted in response to movement of the jogging wheel, and a finite set of indicia arranged in a serial order, wherein moving the jogging wheel in one rotary direction indexes through the set of indicia in a first direction relative to the serial order, displaying or highlighting each, and moving the jogging wheel in the opposite rotary direction indexes through the set of indicia in a second direction relative to the serial order, displaying or highlighting each.

In some embodiments there is a play-once input mechanism, wherein activating the play-once input mechanism causes the digital player to play a file or a group of files in a pre-determined order, the file or group of files pre-associated with the displayed indicia. A preferred media is a compact disc read-only memory (CD-ROM) minidisc.

In some embodiments the system for rendering the files audible comprises an earphone jack and circuitry for sending audio signals to the jack for driving a connected earphone, and in some cases there are two or more earphone jacks, enabling more than one person to connect to the player and to hear audio files played.

In a preferred embodiment the digital player is dedicated for use with a language system, further comprising individual input mechanisms for individual languages, wherein an input from one of the language inputs causes files played to be in the language associated with the language input. In preferred embodiments there are two language input mechanisms. There may also be at least one supplemental information input mechanism for each language input mechanism.

In still another aspect of the invention a compact disc read-only memory minidisc is provided, having a diameter of less than two-inches, and dedicated to one or more lessons for a learning system, comprising individual audio files associated with one or more of pictures, sentences, phrases or alphanumeric representations in one or more printed entities.

In still another aspect of the invention a learning system is provided, comprising at least one printed entity comprising lesson information in an ordered series of one or more of sentences, phrases, pictures, or alphanumeric representations, transparent, electrically conductive traces from individual strategic locations in the at least one printed entity, leading to a contact interface along a border of the printed entity, a digital memory media having recorded thereon separately playable audio files comprising one or both of vocal renditions of individual ones of the sentences or phrases, vocal renditions related to entities in the pictures, or information files, a digital player for playing the audio files from the memory media, rendering the audio files audible, and having a user interface for selecting and initiating playing of individual ones of the files, individually or in a pre-determined order, and circuitry and signal lines connecting the contact interface with the digital player. The system is characterized in that a user touching one of the traces causes the circuitry and signal lines to provide a signal to the digital player to play one or more of the audio files, pre-associated with the trace touched.

In some preferred embodiments the contact interface comprises first contact pads linearly arranged such that the printed entity may be plugged into an edge connector having second contact pads aligned with the first contact pads, the edge connector part of the circuitry and signal lines. Also in some preferred embodiments the first contact pads constitute a jumper system for uniquely identifying the printed entity, which identification is used by the circuitry and signal lines in preparing signals to the digital player.

In embodiments of the invention taught in enabling detail below, for the first time a learning system is provided which overcomes the problems of mass provision for persons who most need such a system, but have heretofore been unable to participate in the systems available.

BRIEF DESCRIPTION OF THE DRAWING FIGURES

FIG. 2b is a right-side view of the digital audio player of FIG. 2a.

FIG. 2c is a left-side view of the digital audio player of FIG. 2a.

DESCRIPTION OF THE PREFERRED EMBODIMENTS

Figure 1:
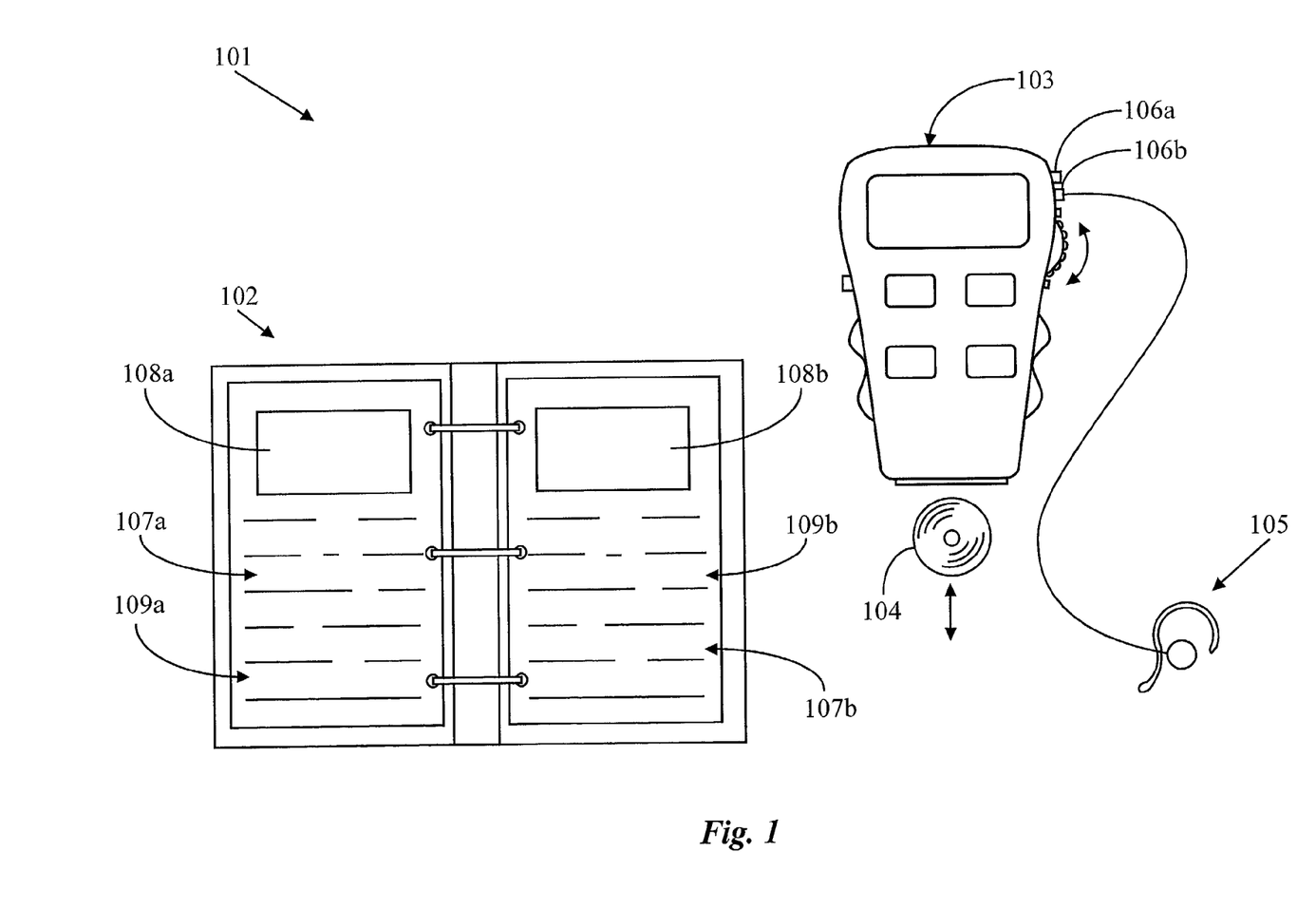
FIG. 1 is a partially schematic illustration of an instruction system according to a preferred embodiment of the present invention.

FIG. 1 is a partially schematic illustration of an instruction system 101 according to a preferred embodiment of the present invention. For illustration purposes, the first example describes an embodiment of the invention for language instruction, and English to Spanish or Spanish to English will be assumed. It should be understood at the outset, however, that the invention is not limited to language instruction, or between any two particular languages.

The invention in a preferred embodiment combines printed material with audio material in a way that enhances the learning experience, and enables larger numbers of people to participate than would be possible with conventional systems. In the combination in the instant embodiment illustrated by FIG. 1 there is a notebook 102, a digital player 103 for playing minidiscs 104, and at least one earphone 105 connected to player 103 by an earphone jack 106a. In this example the earphone is an earpiece that fits behind one ear, as known in the art, but dual earphones and other sorts may well be used in different situations. The minidisc player plays discs of the Compact Disc Read-Only Memory (CD-ROM) type that can be pressed in large quantities from a master, and are read in essentially the same manner that CDs are read; a substantial difference being that the discs are much smaller than well-known CDs, and have a proportionally reduced data capacity. Still, a disc of perhaps 1.5 inch diameter can carry many megabytes of data.

Further, in some embodiments there will be multiple earphone jacks, as illustrated by jack 106b, to which additional earphones may be connected so that two or more persons may take advantage of the system at the same time.

Returning to notebook 102, in a preferred embodiment there are two facing printed entities 107a and 107b, which comprise, in this example, each a picture 108a and 108b, and each a text portion 109a and 109b respectively. Also in the preferred embodiment one printed entity will be all in one language, and the other in another language. For illustrative and descriptive purposes, assume entity 107a is in English and entity 107b is in Spanish.

Turning again to player 103, the player is in a preferred embodiment, as described above, a play-only device for playing small CD-ROM discs. In alternative embodiment the player may be a minidisc (MD) player playing MD media 104, which are miniature CDs, typically enabled for both read and write. In some alternative embodiments recording capability may be needed. CD technology is used because, at the time of the filing the present patent application discs 104, which can store as much as perhaps 200 MegaBytes of data, may be produced for less than $2 per disc, while an equivalent (in capacity) plug-in flash memory card will cost many times as much. In some cases, the CD-ROM minidiscs (pressable and play only) may be made for a few cents each.

In preferred embodiments audio renditions coordinated with printed media 107a and 107b are recorded on disc 104, and player 103 is provided and enabled in a way that a user may quickly seek and play any desired portion of the audio, which, when selected, is played in the earphone or earphones.

Figure 2A:
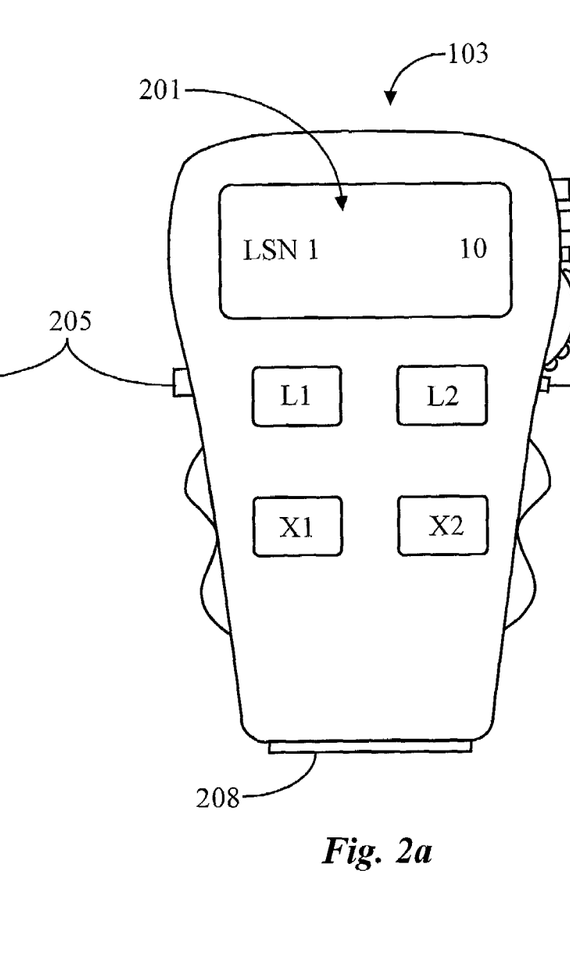
FIG. 2a is a more detailed face-on view of the digital audio player of FIG. 1.
Figure 2B:
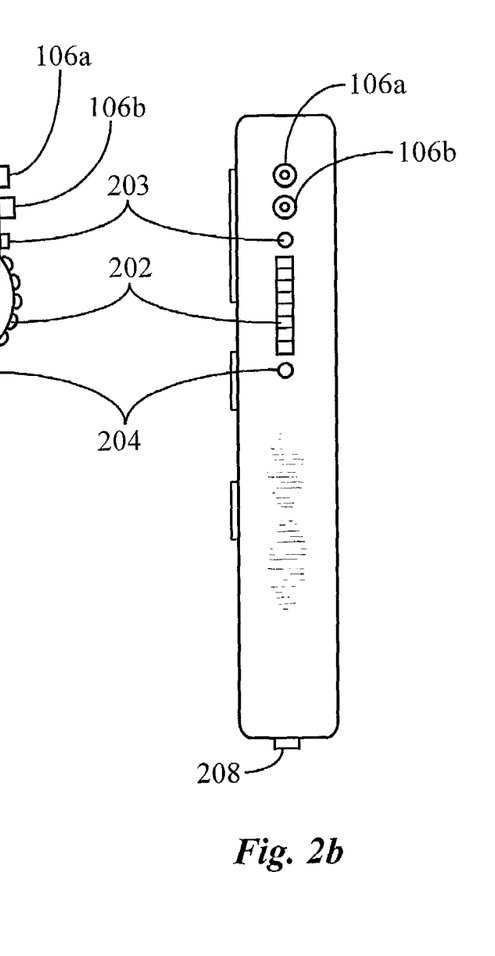
Figure 2C:
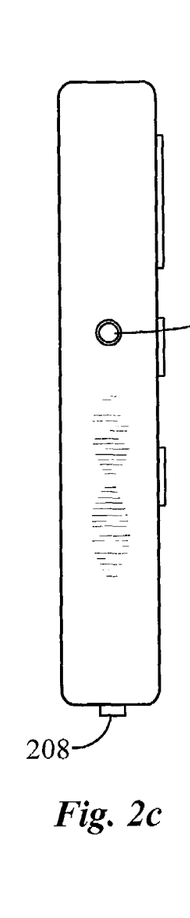

FIGS. 2a, 2b and 2c are a more detailed face-on view (magnified) of digital audio player 103 of FIG. 1, a right-side view and a left-side view, respectively. In this preferred embodiment player 103 has an LCD display 201, a jogging wheel 202, a top-end button 203, a bottom-end button 204, a play-once button 205, a first-language button 206, labeled L1 for language 1, and a second-language button 207, labeled L2 for language 2. There is in addition a port 208 for insertion and retraction of a minidisc memory medium, illustrated as disc 104 in FIG. 1. The purpose and use of these elements will be clear with further description below, following further description of printed entities 107a and 107b of FIG. 1.

Figure 3A:
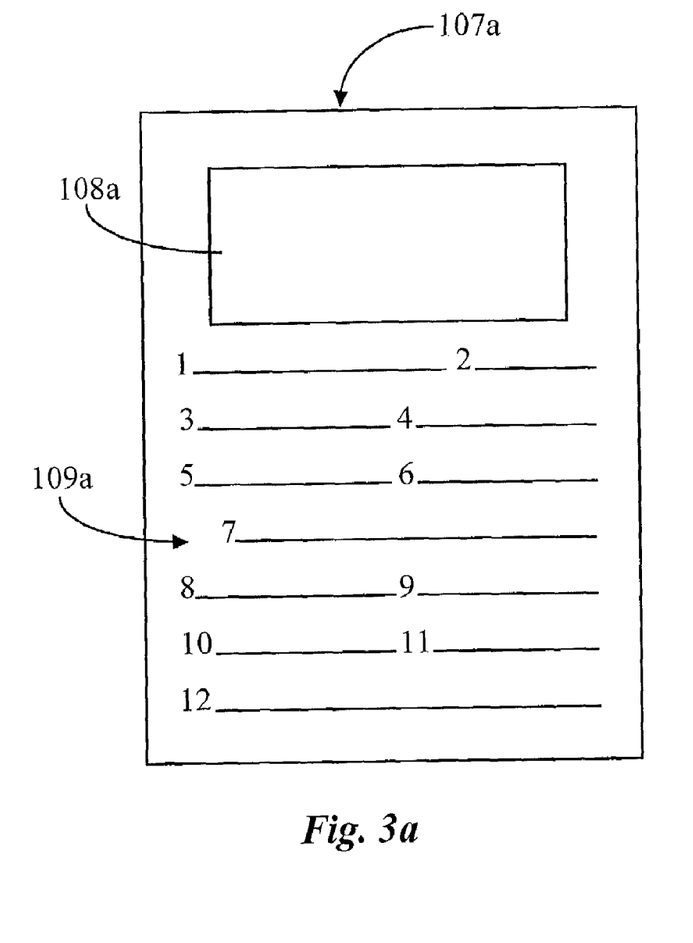
FIG. 3 is a more detailed view of a first printed entity from FIG. 1.
Figure 3B:
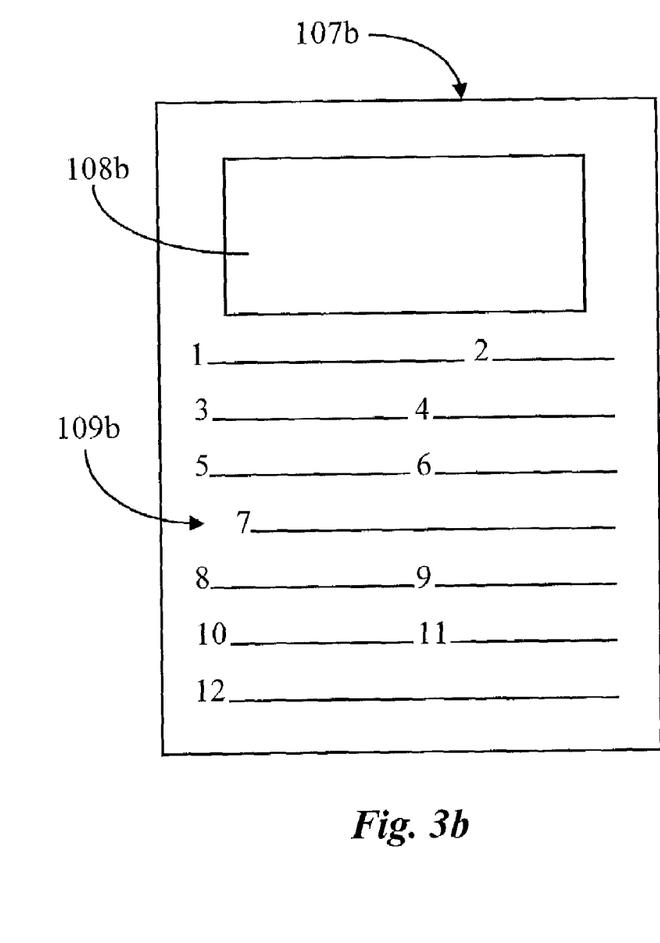

FIGS. 3a and 3b are more detailed views of printed entities 107a and 107b from FIG. 1. In this example the learning system is devoted to language instruction between Spanish and English. We will assume for present exemplary purposes that L1 is for English and L2 is for Spanish. In this example, then, printed entity 107a in FIG. 3a has text in English, and entity 107b has text in Spanish. Pictures 108a and 108b are the same picture. In some cases there will be more than one picture, and in some cases there will be no picture. If there is text annotation on a picture it will be in the language of the particular entity in which the picture resides.

In entity 107a text portion 109a is all in English. In entity 107b text portion 109b is all in Spanish in this example. Moreover there is sentence-to-sentence or phrase-to-phrase correspondence between sentences and phrases between the two entities. In this example each sentence and phrase in each example is numbered with a small Arabic number at the head of each. This identification may take any one of several forms such as numbers shown, color coding, lower-case letters and the like, as long as there is a way for the user to identify a particular sentence or phrase by some visible indicia. In some special cases identification will be word-by-word, such as for a dictionary application.

In the present example, sentence or phrase 1 in English corresponds to sentence or phrase 1 in Spanish, and so on through number 12 in the example. As a very simple example, sentence 1 in English may be "I want to work." And sentence 1 in Spanish may then be "Yo qierro a trabajar." This correspondence continues throughout, even in cases where there is no literal translation, and the number of words and syntax, for example, may differ. Importantly, each sentence or phrase represents a good way to express the meaning in each language, whether the translation is literal or not; and in many cases there will be no word-for-word correspondence.

Referring now back to FIG. 2A, disc 104 of FIG. 1 has recorded thereon audio enunciations of both English and Spanish sentences and phrases corresponding to the marked sentences and phrases shown in FIGS. 3a and 3b. The sentences and phrases are flagged to be sought, found and enunciated by player 103 following input from a user. In the instant embodiment the user may select, using buttons 206 and 207 either English or Spanish. Then, by use of jogging wheel 202 the user can scroll through a list of numbers, up or down, by rolling the wheel up or down, the numbers ranging in this case from 1 to 12. The numbers that relate to the individual sentences/phrases are displayed on the right of display 201, exemplified in this example by the number 10. Alternatively, control may be such that a user uses the jogging wheel to select an indicia, and then the L1 or L2 button to cause the associated sentence or phrase to be played. Pushing L1 causes the system to enunciate the English version, and L2 to enunciate the Spanish version. In this alternative the play-once button may not be used.

As a specific example using the play-one button, should the user select L1 for English, scroll to 10, as shown in display 201, then press play-once button 205, the player immediately finds sentence/phrase 10 for entity 107a, and enunciates the sentence/phrase in earpiece 105 for the user.

The user may thus read the text in the two printed entities shown, select the audio form of any of the sentences or phrases in either language, and listen to the clear enunciation of what he/she reads. The user may also practice repeating the enunciations to develop pronunciation for the language he or she wishes to learn.

It will be clear to the skilled artisan at this point that the system of the invention has the unique feature of being equally useful in going from either language to the other, with the same recorded lesson plan.

In addition to enunciating individual sentences and phrases, the system of the invention is enabled to enunciate all of either printed entity, or other selected portions, such as paragraph-by-paragraph. In the instant embodiment, at the top end of the list of numbers that are associated with sentences and phrases, displayable in display 201, there are three additional indicia in this embodiment, these being A, P1 and P2. The user, by scrolling up to 1 and then further up can display each of the three indicia A, P1, or P2. Scrolling to A and pressing the play-once button 205, causes the player to begin at sentence/phrase 1 for the entity in the last language selected, and to proceed to enunciate through all of the text, in this case through sentence/phrase 12.

If the user selects P1 in the same process, the system enunciates all of the first paragraph, and for P2, all of the second paragraph. If there are more than three paragraphs, there will be more than three indicia P1, P2, . . . Pn.

In a lesson plan there will typically be more than one set of printed entities, each set having equivalent subject matter in each language, and the entities are individual lessons in the lesson plan. At this point attention is directed to FIGS. 2a and 2b, and to buttons 203 and 204. The inventor calls these buttons top button and bottom button. At any scrolling point in any lesson for a lesson plan, pressing top button 203 sends the scrolling to the top of the list, in this example, A. Pressing bottom button sends the scrolling to the bottom of the list, in this case 12.

Top button 203 and bottom button 204 have another function in addition to sending the scrolling to the top and the bottom for a particular lesson (two printed entities and matching audio). The user may scroll through lessons using these buttons as well. Assume the user is on the audio portion for the first lesson. This is indicated in display 201 on the left as LSN 1. If the user presses top button 201 the scrolling goes to A, as described above. At this point, if the user presses top button 203 again, nothing happens, because the system is already on lesson 1 of the lesson plan, and there is no lesson before lesson 1 in any lesson plan.

Now, if the user, on lesson 1, presses bottom button 204, the scrolling goes to the bottom of lesson 1, as described previously. If the user at this point presses bottom button 204 again, the system goes to lesson 2, and the indicia in display 201, on the left, that indicates the lesson number, changes to LSN 2. Pressing the bottom button again at this point, causes the system to index to lesson 3, and the display to go to LSN 3, and so on, until the last lesson in the lesson plan is reached.

If the user is on the last lesson, or any lesson other than the first lesson, the same procedure as described for scrolling through lessons to the last lesson may be accomplished using the top button for scrolling through the lessons to the first lesson. A user may thus quickly go to any lesson in the lesson plan, and then scroll, using jogging wheel 202 to any sentence or phrase in the entity, in either language.

In alternative embodiments other input mechanisms and procedures may be used to scroll through the lessons and the recorded sentences and phrases. There may be, for example, a keyboard allowing the user to enter a pre-programmed keystroke, and then a number, to cause the system to go to any lesson in a lesson plan, and also to seek and find sentences and phrases on the minidisc in each lesson. There may also be a GoToLsn button, for example, and a GoToSen button for in-lesson indexing, for example.

Referring back again to FIG. 2a, there are, in the instant embodiment, two buttons labeled X1 and X2. For each sentence and phrase in each printed entity, in addition to a recorded audio version in the associated language, there is also an explanation in the opposite language for any characteristic that the authors of the lesson plan may deem desirable. As an example, if, as described above, the first sentence in the first lesson is, in English, "I want to work", and the Spanish first sentence is then "Yo qierro a trabajar", the authors may record for each language a brief (or not so brief) explanation or comment. If the user selects L1 for English, and scrolls to 1, then presses the play-once button, the system will enunciate in the earpiece, "I want to work". Assuming that users will need explanation vastly more often for the language they wish to learn, the explanatory comments will be in the language opposite the enunciation language; so if the user then presses X1 the system will enunciate, in Spanish, an explanation of the words of the sentence, and perhaps the sentence structure; or any further information the author may deem important for instruction of the user regarding the associated sentence or phrase.

The same is true for the explanatory comments recorded for the Spanish sentences and phrases, which comments will be in English. In the example given, then, there will be, for lesson 1 (LSN 1), 12 recorded sentences/phrases in English, 12 explanatory comments in Spanish for the recorded English sentences/phrases, 12 Spanish sentences/phrases, and 12 explanatory comments in English for the Spanish sentences/phrases; making a total of 48 recorded audio entities for the exemplary lesson. The numbers, of course, will differ for a lesson having more or fewer sentences/phrases in the lesson.

Given the unique system described thus far, authors may prepare individual lessons or lesson plans comprising a number of lessons on the minidisc media, and, for language instruction as in the embodiment thus far described, in any two languages. Using the printed entities for each lesson, one in each of the two languages, and preferably on facing pages as shown in FIG. 1, the associated recorded entities on the minidisc, and the minidisc player designed to allow a user to quickly index to any lesson, and to any recorded audio entity associated with a lesson, and to play that recorded entity, the user can now study either language from the viewpoint of the other language, practicing a number of useful procedures.

To illustrate, assume the user is an English-speaking person who wishes to learn Spanish. The user has in his/her possession one of the players 103. The user buys or otherwise obtains a Spanish/English lesson plan. There will be available a sequence of lesson plans of ascending order of complexity in each language, carefully designed to lead a student successfully to competence in the language desired. Each lesson plan comprises a set of printed entities, one in each language for each lesson in the lesson plan, and a minidisc having the recorded entities in each language for each lesson in the lesson plan.

The user inserts the printed entities in order in notebook 102 and loads the minidisc 104 for the associated lesson plan in the player. The user can open notebook 102 to the first lesson in the plan, and direct his/her attention to the printed entity for the language desired to learn. We have assumed the user is an English speaker desiring to learn Spanish.

As a beginning learning process the user may be encouraged to play the printed entity for the new language (Spanish) in its entirety, which, as described above, may be done by pressing language button L2 for Spanish, setting the scrolling list to A (for all), and pressing play-once button 205 once. The system will begin at sentence/phrase 1 in Spanish, and enunciate all of the recorded entities in order. The user can follow the printed Spanish text in the lesson, which will encourage quick association of the Spanish pronunciation with the written form of the language. This is valuable drill, even in the absence of understanding all of the words and sentences/phrases, and, if used diligently with other procedures with the system, will teach the user to read in the new language.

Now the user may select portions of the text, such as indicated above as P1 and P2, to cause the system to enunciate those portions selected. And the user may select sentences and phrases one-by-one to hear the proper pronunciation and to pause to practice the pronunciation.

For vocabulary and understanding the user may visually associate the Spanish enunciations with the English equivalent printed text. It is an easy task for the user to play "Yo querro a trabajar" and see that it means "I want to work" in English. In many cases the association will be readily apparent, and no explanation will be needed. In many cases the user will desire to visit the explanatory recorded entity in English associated with a Spanish sentence or Phrase. There may also be explanatory recordings for the entire text (All) and for the individual paragraph portions (P1 and P2 in the example).

Very importantly the user is in control, and has all of the tools he or she needs to learn rapidly and effectively. The user will gravitate to those sequences that are most rewarding, and may pause and revisit at will, so there is no constraint by the system to exhaustive practice. Each user can proceed at his or her own pace.

Returning now to FIG. 2*a*, it was described that there may be more than one earphone jack for a player, illustrated by jacks 106*a* and 106*b*. This makes it possible for two people to use the device at the same time, with just one player (the player is the most expensive unit). The two people may use the same lesson plan, or may have copies. Of course, only one person may manipulate the player at a time, but the two users may share the player back and forth, and they may practice pronunciation with one another, and correct one another in the process.

Figure 4:
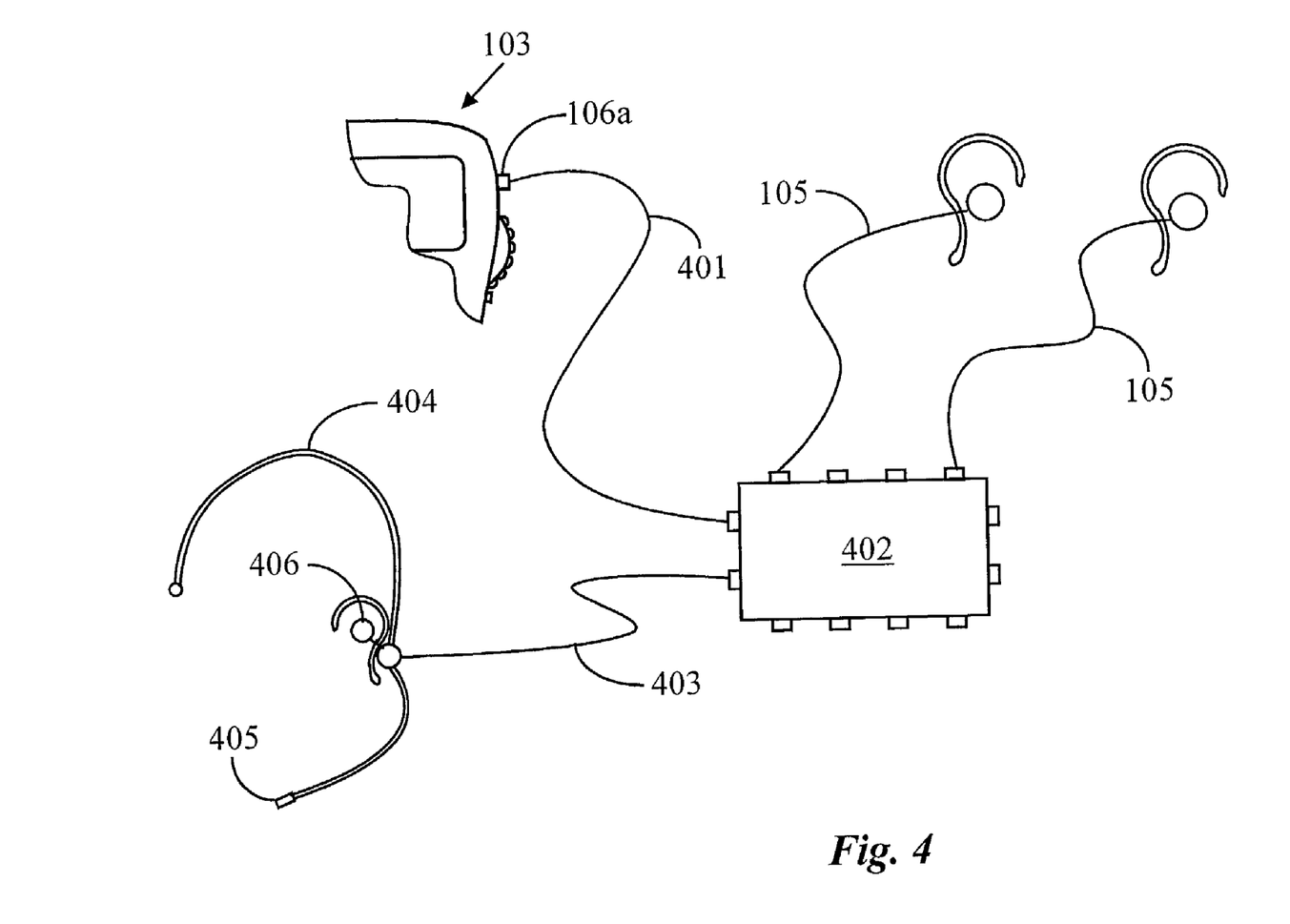
FIG. 4 is a more detailed view of a second printed entity from FIG. 1.

In an alternative embodiment, illustrated in FIG. 4, a plurality of students may be enabled with a single player. An audio splitter 402 is provided which connects to player 103 by a tether 401, and a number of output jacks, in this case 9, are provided to connect to up to nine earphones 105. There will be a power supply as well, to power the several earphone capability, although this is not shown. In addition there is in a preferred embodiment an input for a headset 404 with a microphone 405 and earphone 406 on a connection 403. One person may then manipulate the player, and talk to the other participants via the headset.

In some embodiments the headset is not needed, because the users may sit around a kitchen table, for example and talk to one another. In some embodiments all of the connectors to the splitter may have headphones with microphone as well. Importantly, this system may be used without an instructor. Students, or members of a class or a family may use one player, and take turns controlling the player. The person who controls the player may follow an agreed-to protocol to take requests, play audio entities, and so forth. The several users may also help one another in critique of pronunciation and so on.

A player 103 without ability to record has been selected for the preferred embodiment described above intentionally to keep system cost to a minimum, and the multiple use options are provided to extend the use of a minimal-cost system to many more people, on the theory that the people most in need of such a system are typically people without the means to buy expensive computer equipment and other expensive systems.

In an alternative embodiment a player with a built-in microphone and an ability to process microphone input adds further functionality to the system. In this embodiment users are enabled to record their own voices speaking the language they are studying, and then listening to themselves as means of improving their language abilities. In yet another embodiment the player has a computer link, such as a USB link, enabling users to download and record from a personal computer, and to upload audio files from a personal computer. In this embodiment a user may record in the target language, and then upload and send the recorded files to a service for evaluation.

In the description of embodiments thus far, emphasis has been placed on association of printed text with audio files. Little has been said about the use of pictures, such as pictures 108a and 108b in FIGS. 3a and 3b. In some embodiments of the invention pictures are used either with or without captions. In this embodiment a series of pictures may be used much like a cartoon series, with people pictured in situations that tell a story. In this case, there is a visual association made with a person in a picture and the scrolling list that is presented on the display of the minidisc player. For example, there may be a small indicia on people in a picture, such as a number or a letter, or near the person in the picture. When the user scrolls to the same indicia in the scrolling list and pushes the play-once button, a monologue is played as if the person is speaking. In other cases association may be made between objects in pictures and audio files. This is used in some embodiments in vocabulary building, wherein the objects in the picture are named in the associated audio files. In the text-centered embodiments, association is made between the written and the spoken word. With the use of pictures, association is made with images.

Figure 5:
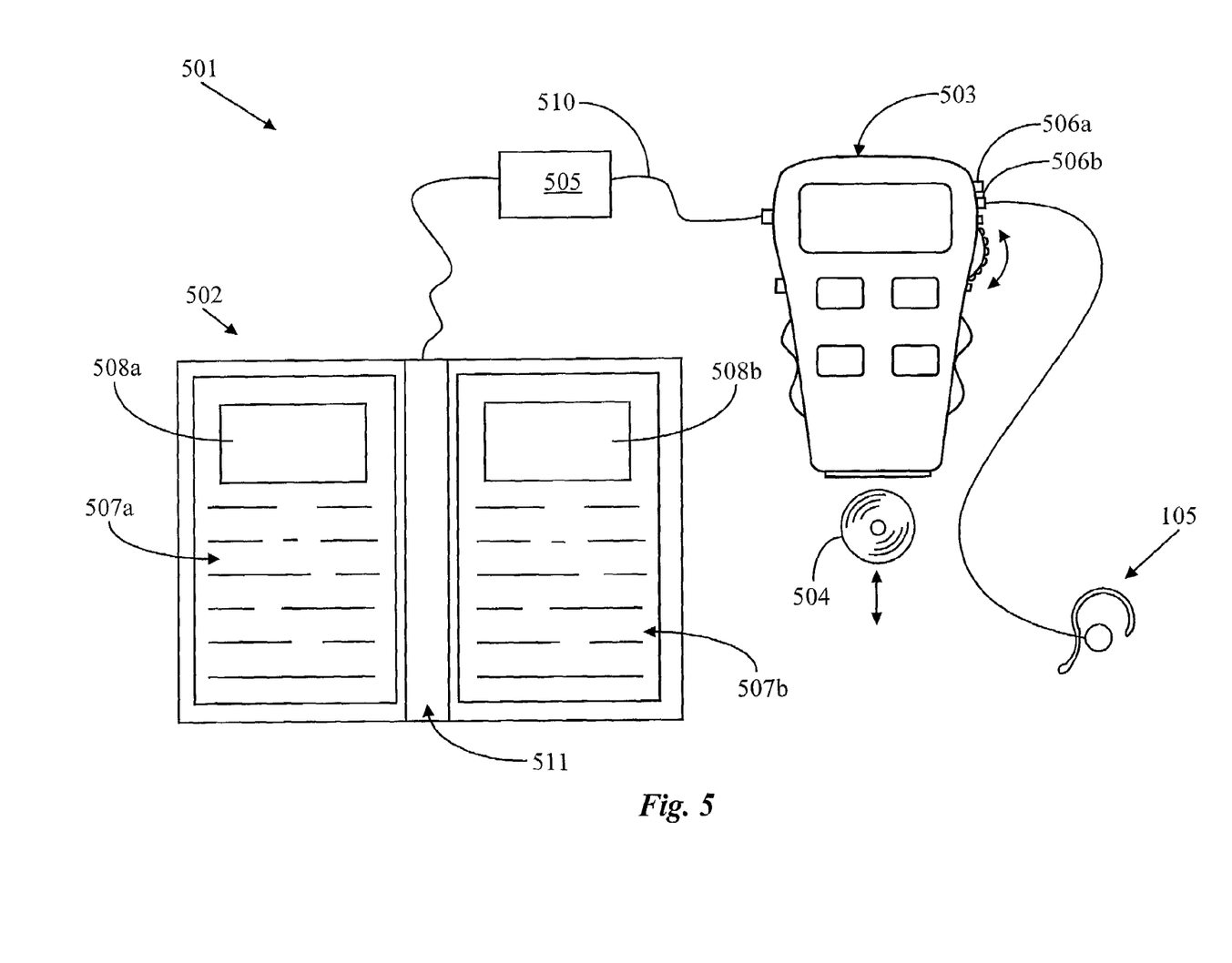
FIG. 5 is a partially schematic illustration of an instruction system according to an alternative embodiment of the present invention.

In an alternative embodiment of the invention, a unique communication system is provided to make association with words and pictures in the printed entities, and recorded audio. FIG. 5 is a partially schematic illustration of a learning system 501 much like that shown in FIG. 1, but with some very important differences, according to an alternative embodiment of the present invention.

In the embodiment depicted in FIG. 5 there is a system, described in enabling detail below, for correlating a touch of an element in a picture or of a word or text portion of a lesson, with an audio rendition stored on minidisc 504, such that an audio enunciation is made in an earphone 105 connected to one of earphone plugs 506a or 506b. A distinct advantage in this embodiment is that a user need not scroll through a listing on a digital player 503, similar to player 103 of FIG. 1, to play the audio for a portion of a printed text entity.

As before, one lesson is shown for a lesson plan which may have many more lessons, and the lesson plan shown comprises two printed entities 507a and 507b. In this example the lesson is for Spanish to English or English to Spanish instruction, and there are two printed entities in the lesson, 507a in English, and 507b in Spanish. In lesson 107a shown in FIG. 1, or lesson 107b shown in FIG. 1, there are numbers or letters relating each entity in the printed lessons with a file on minidisc 104, and the user uses jogging wheel 202 (FIG. 2) to quickly locate the pertinent file to play the audio version by pressing the play-once button 205.

In the system of FIG. 5 there are transparent but electrically conductive traces from each element, such as a sentence, in a lesson plan, to a logic system. In a preferred embodiment the user need but touch an element, such as a word or a phrase, and the system immediately renders the audio version in the earphone. In one example, referring to pictures 508a and 508b, which will be, in most cases, the same picture, one may touch, for example, a person to hear an audio rendition. Consider for example, a picture in which a woman is standing in front of a teller at a bank. When the user touches the woman in picture 508a, the audio that plays may be "I want to make a deposit, please" in English. When a user touches the same woman in picture 508b, the audio rendition will be the equivalent phrase in Spanish. One may then touch the teller in either picture, and the audio rendition will be the teller's response to the woman in the appropriate language. There are a multitude of possibilities for teaching situations in which this "touch-and hear" system may be appropriate and valuable.

As another example, there may be a dot at the beginning of a paragraph of text, or a "pi" symbol, which is often used to mean "paragraph". When a user touches the symbol the audio rendition is a recitation of the full paragraph in the appropriate language. The space at the beginning of a sentence or phrase may, in another example, be touched to hear the audio rendition of the sentence or phrase. Touching a word may render the audio of the word, and so on.

In the system of FIG. 5 a two-way edge connector on a mounting board 502, simulating a notebook, is provided to accept electrical contact from transparent traces on lesson pages, and to provide a signal corresponding to any trace via bus cable 509 to a logic system 505, which in turn provides instruction to player 503 on line 510 to play the appropriate audio file or files in the appropriate language.

Figure 6:
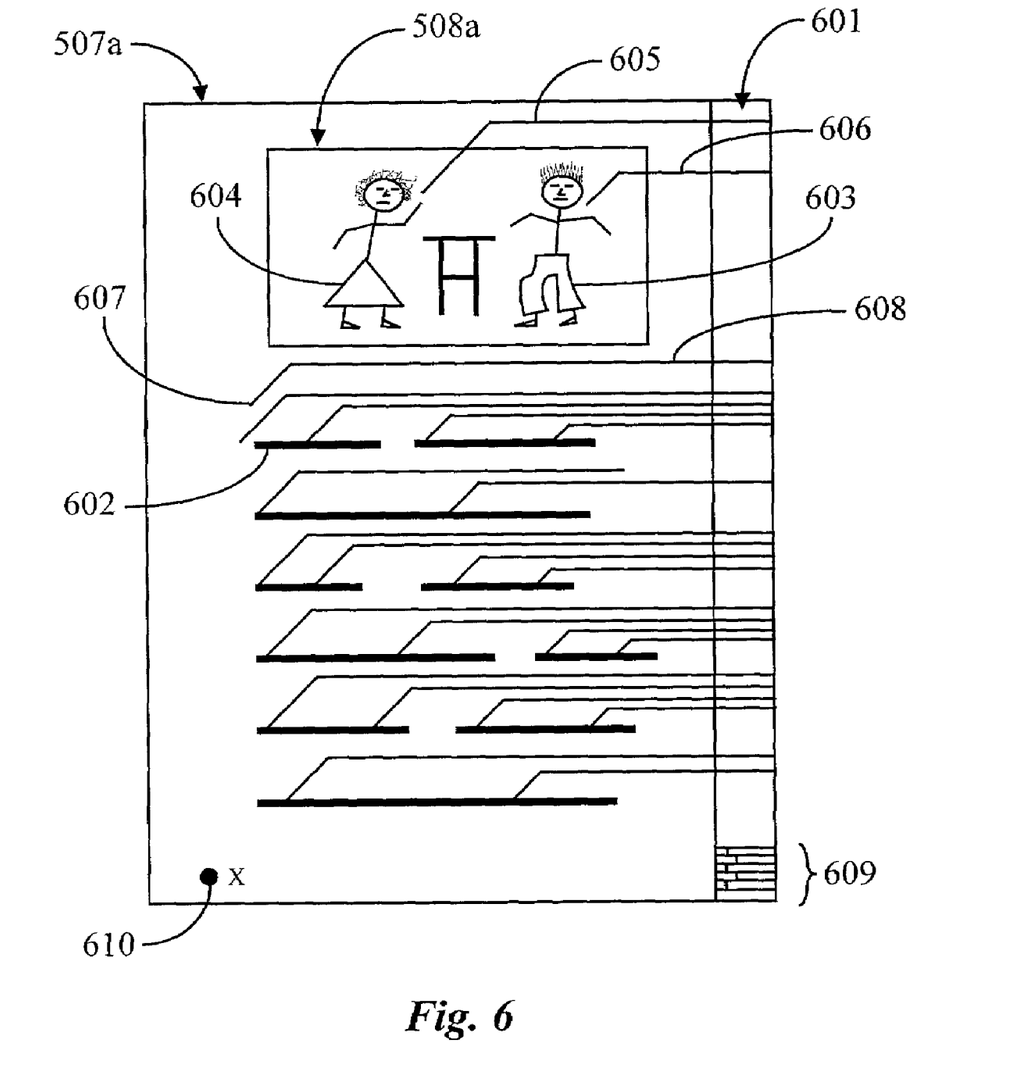
FIG. 6 is a more detailed illustration of a printed entity from FIG. 5.

FIG. 6 is a more detailed illustration of a printed entity, for example entity 507a, from FIG. 5. As shown in FIG. 5, there is a picture 508a and a block of text below the picture. The block of text is illustrated as a group of heavy lines, such as line 602, arranged row-on-row, each heavy line representing a sentence or a phrase. For entity 507a the language is English. Printed entity 507b (not shown in FIG. 6) is just the same, except the language for all text is Spanish, and the edge contact area 601 is on the left rather than on the right as shown in FIG. 6.

Picture 508a in FIG. 6 shows a man 603 and a woman 604 separated by a table. Presumably the man and woman are communicating. In this example the entire area of the woman picture element 604 is overlaid with a transparent, electrically-conductive ink or other transparent, electrically-conductive material. That area is joined by a transparent, electrically-conductive trace 605 to an edge-contact area 601, where the conductive trace extends over the width of area 601. The entire area of the man picture element 603 is similarly traced to edge-contact area 601 by transparent trace 606. The continuation of transparent traces into area 601 comprises not transparent conductive material, but metal such as copper, aluminum or gold, to make reliable electrical contact with an edge connector detailed below.

Continuing, a button (visible ink) 607 is overlaid with the transparent electrically-conductive medium, and connected by transparent, conductive trace 608 to edge-contact area 601. Similarly every text sentence or phrase 602, and every small space prior to a sentence or phrase is connected by a transparent, conductive trace to the edge-contact area 601. Although not shown in FIG. 6, there may also be separate traces for each word in a sentence or phrase as well. In the case where each word is enabled with a trace, logic provides for enunciating a sentence when a user drags his/her finger across a sentence or a portion of the sentence.

In a preferred embodiment of the invention each trace proceeds, in use, through an edge-connector apparatus yet to be described to circuitry in which each trace is charged to a low voltage by a capacitance circuit and connected to circuitry arranged such that, when a person touches with a finger the appropriate trace or connected area, the capacitance is discharged or substantially altered, to a point that the circuitry recognizes the change in charge as a signal, and provides another, more positive signal in response to the touch. In this manner the system will recognize which picture element or text sentence or phrase, or space between phrases has been touched.

As before, a lesson plan may consist of a number of lessons, each lesson comprising a page in one language, and a facing page in the other language having equivalent pictures, sentences and phrases. In a preferred embodiment the several lessons in each language are provided loose, in a stack, or in a binder from which they may be easily removed and engaged in edge connector 507. For each lesson the user takes the two lessons, one in each language, and plugs them into an edge connector apparatus described below. As each lesson is finished, the user removes the lesson pages from the apparatus and inserts the two pages of the next lesson.

It is necessary that the system know which lesson is being used, to be able to provide the proper corresponding audio renditions for the appropriate lesson. There are, to accomplish this purpose, a set of edge traces 609 not connected by transparent traces to any entity on the page. These traces are jumper traces to indicate to the edge connector apparatus which lesson in a lesson plan is presently plugged into the edge connector apparatus. It can be seen in FIG. 6 that individual ones of traces 609 are connected (jumpered). The pattern of connection of the individual traces indicates the number of the lesson in a lesson plan. For example, in one embodiment there are eight traces in four distinct pairs in set 609. Each pair is used to indicate a 1 or a 0 in a four element digital word. If the traces in a pair are jumpered (connected) a 1 is indicated. If not, a zero is indicated. So, depending on the state of jumpered pairs, any number from 0 to 15 may be indicated with the four pairs of traces. These may be read by the system as 1–16, so 16 lessons may be numbered in this manner. In an embodiment of five pairs of traces 609, 32 lessons can be numbered and distinguished. The number of lessons in any case can be doubled with the addition of one more pair of jumperable pair of traces.

Figure 7:
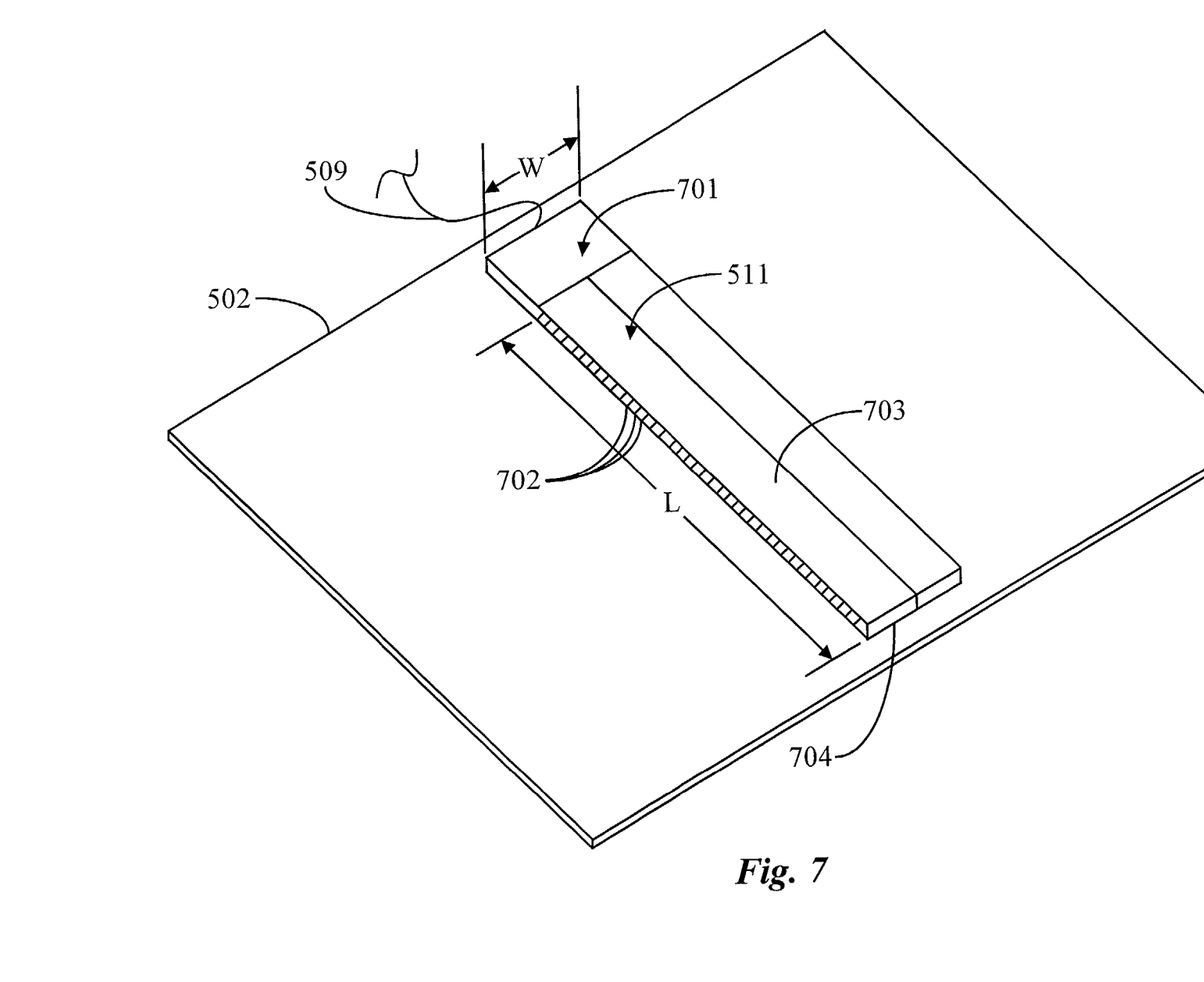
FIG. 7 is an illustration of an edge connector from FIG. 5.

FIG. 7 is a more detailed illustration of edge connector apparatus 507 on mounting board 502 for use with lesson pages (printed entities) in an embodiment of the invention. Width W of connector 507 is substantially twice the width of area 601 of FIG. 6. Connector 507 has a topside 703 and a bottom side 704, and opens to both the left and right side. Each side (only the left side opening is seen in FIG. 7) is enhanced with contacts 702 implemented between the top side and the bottom side, such that pages 507*a* and 507*b,* for example, or any other pair of pages for a lesson, may be inserted to (engaged in) the edge connector, and be viewed as two facing pages in a book. There are contacts in connector 507 also for set 609 (FIG. 6) to indicate the lesson number in a lesson plan.

A power and control circuitry 701, implemented in this embodiment at one end (upper) of edge connector 507, provides charging circuitry for transparent traces on lesson pages and interpretation of touches, as well as translating the signal from jumperable traces 609 to indicate the lesson number.

As an example of the function of circuitry 701, assume a total number of traces on each page of the lesson plan as 30 traces, not including traces 609 that indicate a lesson number. Logic in circuitry 701 maps the input from the edge connectors onto bus 509, which has multiple conductors, each conductor representing a 1 or a 0 bit in a binary number. The input from jumperable traces 609 is mapped directly onto four conductors of bus 509, and it is required that the input from traces 609 on each page of the lesson match, because it is necessary that the two pages are for the same lesson in a lesson plan.

There are 30 traces on each of lessons 507*a* and 507*b,* for a total of 60 traces. The logic is so arranged that the system will respond only if just one trace touch is made at any point in time. Bus 509 then needs 7 additional traces to carry as many as 128 different binary signals in parallel. Adding in the four traces indicating from 1 to 16 lessons, there will be 11 conductors in bus 509. A simple control microprocessor in circuitry 701 with a clock input reads the state of incoming signals from the edge connector each cycle, and places the appropriate binary word on bus 509. In some cases the clock signal may be placed on a conductor of bus 509 as well, for use by connected circuitry.

Logic circuitry 505 reads an 11 bit binary word for each clock cycle, and outputs a command to player 503 on command line 510 (FIG. 5) when each new touch is made. The commands cause player 503 to seek the appropriate audio rendition and to play that appropriate rendition into one or more earphones connected to the player. These commands are essentially the same as commands that are input to player 103 by play-once button 205 (FIG. 2) in accordance with the indication provided by jogging wheel 202. There are, for each lesson, and for a lesson plan, a finite and distinct repertoire of audio renditions. So for example, when a user touches woman 604 (FIG. 6), the logic circuitry 505 knows, by virtue of the state of jumperable traces 609, which provide 4 bits of the 11 bit word, which lesson is in use, and by the state of the remaining 7 that the woman's vocal rendition is wanted, and the appropriate command is sent to player 503, which immediately plays the appropriate audio file or files. Similarly, commands are formed to player 503 for a touch of any one of the transparent traces.

In a preferred embodiment, once a touch is made to a transparent trace a look-up is made to a stored command table in circuitry 505 to retrieve and send the appropriate command. No additional command is sent until the previously commanded rendition is complete.

The embodiments taught with reference to FIGS. 6 and 7 provide just one way touches to the transparent traces in a lesson may be communicated to the digital player. In another embodiment there may be a system provided with an edge connector for each page of a lesson plan and a contact system for indicating to the system which lesson is currently displayed.

There are number of ways the hardware and software can be implemented in circuits 701, 505, and in player 503 to accomplish the ends desired. The detailed accomplishment of these functions is a matter of electronic engineering, and not a proper subject of this patent application.

Thusly, a user may insert into edge connector 511 any two facing pages of a lesson in a lesson plan, and touch-and-hear any desired portion. The possibilities are numerous and the response immediate.

In a preferred embodiment of the invention a simple memory at circuitry 505 remembers the last command given to player 503, and there is on each facing lesson page an input button having a trace, which, when touched, will cause the system to play the appropriate explanatory comment for the last audio rendition played referring again to FIG. 5, although four buttons appear on the face of player 503, analogous to buttons L1, L2, X1, and X2 of player 103 of FIG. 2*a,* these buttons have no function in the system of FIG. 5. In some embodiments, however, both the buttons and the touch-sensitive lessons may be used, providing a choice for the user. In one preferred embodiment player 503 is a small black box, and may be built into the structure of board 502 and edge connector 507, or any other appropriate structure, with headphone jacks provided for audio output.

In descriptions of embodiments thus far, the audio player has been described as a minidisc player for playing CD-type minidiscs. This was done because the minidisc media is the least expensive form of memory, and helps to reduce the overall cost of the system to potential users. The system is not limited to minidisc players, however, and in other embodiments may use players with on-board or insertable flash memory, with ROM and RAM memories, and the like, and with standard CD-ROM players. There are no specific limitations to the kind of memory media that may be used, although in some embodiments minidisc media is preferred.

In some embodiments of a language learning system according to the invention only a single printed entity is used, having text versions in two languages. In these embodiments blocks of text and/or pictures may be separated into distinct regions of the printed entity, or may be intermingled in any fashion. In versions relating text or pictures to audio files by visible indicia, described above with the use of FIGS. 3a and 3b, all of the text and pictures appear on a single page, either in separately identifiable blocks, or intermingled, and there may be a single series of indicia, rather than repeated indicia as previously taught.

In the single lesson page embodiment for language learning, in the touch-and-hear mode described above, one lesson page is provided, which may be engaged in one side of the apparatus shown in FIG. 7, or a similar apparatus may be provided having one edge connector instead of two.

Further, in an alternative embodiment for language learning, a single printed entity may be provided only in the language the user seeks to learn, and associated audio files provide both enunciation of text in the printed entity, and supplemental and explanatory information, such as the meaning of a sentence or phrase, and/or an audio version in the user's first language. In this alternative embodiment association may be by visible indicia or by the touch-and-hear system taught above.

In yet another aspect of the present invention the learning system is dedicated to teaching other subject matter than languages. In this embodiment typically each lesson comprises a single page or a set of pages. Referring again to FIG. 6, picture 508a may be a display of a chemical formula, and the text area beneath the picture may be explanatory material regarding the chemical formula. Audio files associated with the text and/or the picture can be dedicated to further information to any depth desired. Such a system can be dedicated to learning about virtually any subject matter in any language. A lesson may be dedicated to altering the user's accent in the user's first language, for example. A lesson may be dedicated to learning appropriate social behavior for specific circumstances. A lesson may be dedicated to learning appropriate dress conventions for specific occasions.

In still other embodiments the system may be devoted to persons who cannot read. Among such potential users of the system are the many children of migratory families that enter school systems in new lands, without any knowledge of the new language or any ability to read the old one. In these cases the system may use such as pictures and cartoons extensively in the printed media, rather than text (the children cannot read). Symbols can be used to relate pictures to audio files, and the audio files can be in both languages, and the child can quickly pick up the game of looking at a picture, seeing the objects and situation, and selecting the audio files to see what the people are saying or doing in his/her own language, and then also in the new language to learn. In some cases the printed entities can still provide words in one or both languages in text form, and the lesson plans can teach the child to read at the same time as teaching the child a new language. In some cases lesson plans will be provided specifically for teaching reading skills to persons who can speak a language, but have yet to learn to read, including children just entering school. The lesson plans can be devised to use the tools available to the target audience.

In yet another embodiment of the invention the system may be used by businesses for instructing employees and enhancing work skills of employees. For example, a business may prepare lesson plans comprising a series of printed entities having basic instruction in operation of company equipment, such as cash registers, cleaning equipment, stocking, and much more. The audio files will then be explanatory and supplemental as a way of leading the trainees through the lessons.

Figure 8:
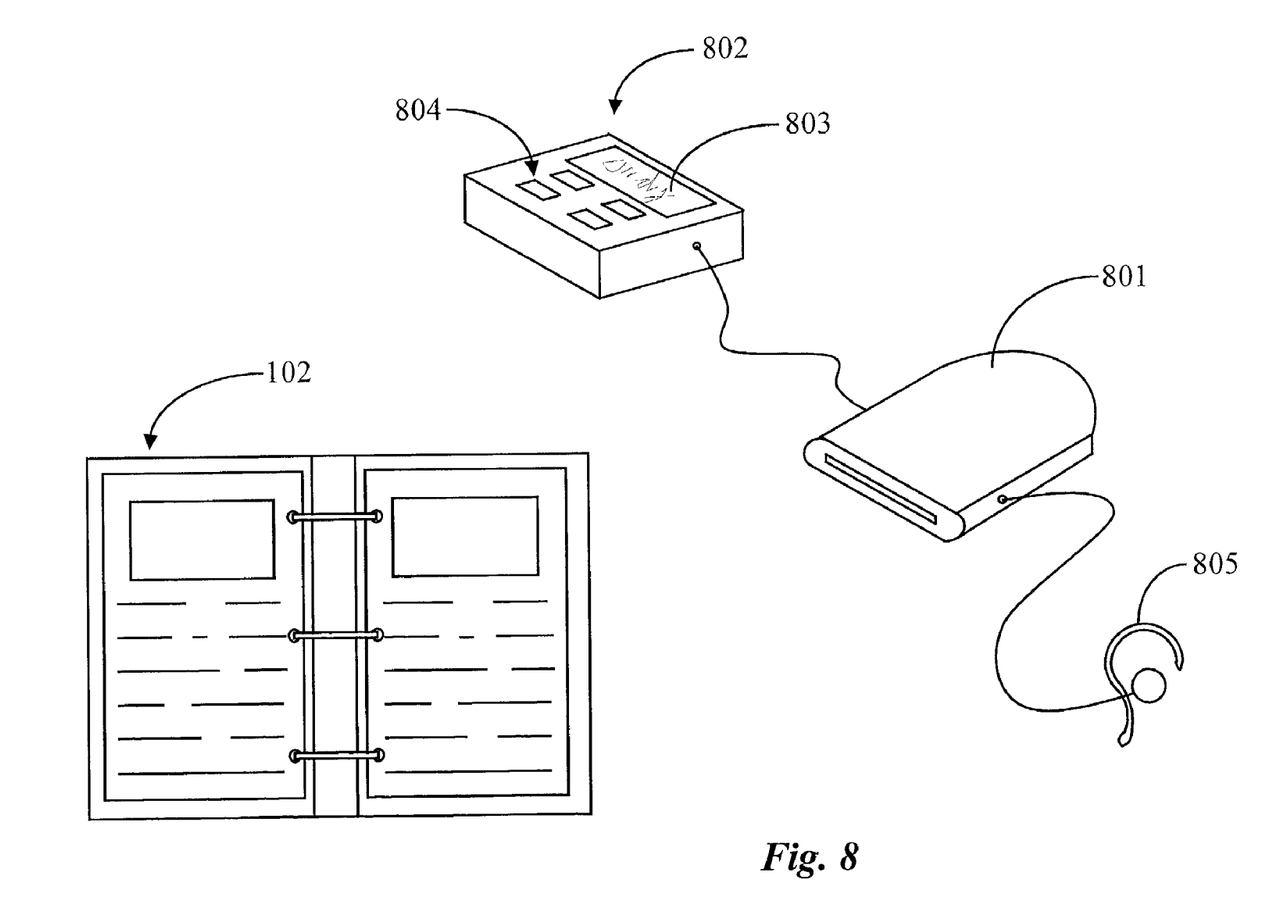
FIG. 8 is a partly schematic representation of a learning system in an alternative embodiment of the present invention.

In yet another embodiment of the invention, a memory system, such as a CD-ROM player is used, playing media of either a standard or reduced size, but without controls on the player for finding the appropriate files to play; or at least without using controls generic to the player. FIG. 8 is a partly schematic illustration of such a system. In this alternative embodiment player 801 may be, for example, a standard CD-ROM player with an output jack for driving an earphone 805. Control is provided by a special box 802, which has the control inputs 804 and display 803 that were previously attributed to player 103, for example. An advantage of this embodiment is that development of the control box and interface to a standard player may be more desirable than a completely new design.

In still other embodiments a system such as that in FIG. 5 may be provided in the architecture of FIG. 8. In this case a mounting board 502 replaces notebook 102 of FIG. 8, and the mounting system for touch-enabled lessons is connected to control box 802.

In another embodiment of the invention, the system can be dedicated to teaching music. Lessons may be dedicated to musical theory, with printed entities showing notes and clefs and timing, for example, and audio files with examples of tone and scales, for example, as well as supplemental information. Printed entities may also be prepared having pictures and text showing a musical instrument, a guitar for example, fingering for chords, and the like, and the audio files may then have explanations and instructions, and audio examples of how the instrument should sound when played. Lessons can be prepared for teaching virtually any sort of instrument. Lessons can be dedicated to classical music, including history.

In other embodiments lesson plans may be dedicated to teaching musical voice, wherein printed entities have practice scores and audio files examples of how to sing them. The system can also be dedicated to developing musical groups, such as choirs, and special plans for special occasions, such as Christmas and Easter performances. Lessons can teach chants and services for various religions. Skill in sports can be taught, as well as auto mechanics. It will be clear to the skilled artisan, after the teaching of this specification, that there is no limit to how programming of the human mind may be accomplished in embodiments of the present invention.

As was previously described, an object of the invention is enable the vast majorities of individuals in the world that have heretofore been completely shut out of any really workable way to improve their knowledge and skills, by providing a really inexpensive and easy-to-use tool, together with an inexpensive way to provide lessons, and an ability to target lessons to large groups of people at the level of their current abilities and knowledge, without the usual necessity of training and providing teachers. The digital player upon which embodiments of the invention is based is intentionally designed to have only the set of computer-like abilities that are really needed, to be therefore inexpensive, and the lessons are provided on a very inexpensive media, to keep costs truly low and accessible to everyone. In many cases players can be provided to large numbers of individuals and families to enable the individuals and families to use the lessons, which can be provided also at low cost, but, by volume over time, enough to amortize the cost of the enabling player.

If the system is used in quantity there are also substantial social, economic and political implications. The vast populations of people who have heretofore had no way to improve their skills and knowledge, and therefore have been forced to live in poverty, can steadily become more and more productive, and the result can only be good for everyone concerned. Vast new markets will be developed, and a realignment of the third world could result. The only impediment has always been the inability of most people to make forward strides in education and skills.

Another area of opportunity, if a broad base of digital players and lesson plans results, is the opportunity for advertisement. The new advertising vector may enable, because of the low cost of the system, a situation where manufacturers and service providers will provide players, and even lesson plans, at no cost to the users, just for the advertising potential.

Clearly the learning potential for systems in embodiments of the present invention is infinite. In one sense, the inventor believes human beings may be considered very advanced computer systems, capable of accepting and altering and using sophisticated programming. Verbal and written language, including all sorts of symbols and body signs, are the programming language for the human computer. The human computer is far above mechanical versions that humans have created in their own image, and is capable of altering and interpreting incoming programming, and using the programming in different ways. The system of the present invention in its many embodiments is a facilitator for programming the human.

Once a person or a family is enabled by a digital player according to an embodiment of the present invention, having one or more outputs for audible rendition of audio files, the ability of that person or persons in that family to program themselves in an infinite variety of ways is enormously enhanced. It remains for other interested third parties to provide just the recorded media and the associated printed entities. At the time of filing the present patent application a minidisc with 100 megabytes or more of information, enough for the audio files of a robust series of lessons in a lesson plan, may be produced in large quantity with a lesson plan recorded for as little as twenty-five cents per disc. The printed lesson pages of the indicia-associated form are simply printed pages, and can be produced for at most a few cents each in volume. Learning is thus brought to the masses that could never otherwise participate, and a new force for economic well being and for breaking down language and cultural barriers is born.

It will be apparent to the skilled artisan that many changes may be made to the embodiments taught in enabling detail above, without departing from the spirit and scope of the invention. Many have already been discussed, but many more will be apparent. The invention is limited only by the breadth of the claims that follow.

What is claimed is:

1. A system for teaching a second language to a person fluent in a first language, comprising:
    a touchable printed entity including with printed pages having sets of sentences, each set comprising a first sentence printed in the first language in close proximity to the same sentence printed in the second language, each set of two sentences annotated by an identifier, the identifier being a number, letter or symbol unique to each set of sentences;
    a digital memory media having recorded thereon separately-addressed digital audio files associated one-to-one with individual ones of the sets of sentences, each audio file being a verbal rendition of the sentence in the second language in the associated set of two sentences;
    an audio player separate from the touchable printed entity and coupled to the digital memory media, the audio player having a display enabled to display the identifiers, a scrolling input for scrolling through and displaying identifiers one at a time, and a play input for playing an audio file associated with the displayed identifier;
    wherein the digital audio files are recorded on the memory media associated with the identifier used to annotate the associated set of sentences, such that audio files may be selected to play from the media by selecting the identifier, providing thereby for a user to see the two printed sentences in the first and the second language in close proximity, and to quickly select and play the audio file for the sentence in the second language.

2. The system of claim 1 wherein the memory media is a digital memory card with a physical interface for plugging into the audio player.

3. The system of claim 1 wherein the memory media is a compact disc (CD).

4. A method for teaching a second language to a person fluent in a first language, comprising:
    (a) displaying to the person a touchable printed entity including with printed pages having sets of sentences, each set comprising a first sentence printed in the first language in close proximity to the same sentence printed in the second language, each set of two sentences annotated by an identifier, the identifier being a number, letter or symbol unique to each set of sentences;
    (b) providing to the person an audio player coupled to a digital memory media having recorded thereon separately-addressed digital audio files associated one-to-one with individual ones of the sets of sentences, each audio file being a verbal rendition of the sentence in the second language in the associated set of two sentences, the digital audio files recorded on the memory media associated with the identifier used to annotate the associated set of sentences; and
    (c) selecting and playing by the person, individual audio files in the second language for a particular set of sentences, by selecting the identifier of the particular set of sentences in an input mechanism of the player, providing thereby for the user to see the two printed sentences in the first and the second language in close proximity, and to quickly select and play the audio file for the sentence in the second language.

5. The method of claim 4 wherein the memory media is a digital memory card with a physical interface for plugging into an audio player.

6. The method of claim 4 wherein the memory media is a compact disc.

* * * * *